United States Patent
Beard et al.

(10) Patent No.: US 10,699,241 B2
(45) Date of Patent: Jun. 30, 2020

(54) CHEMICAL ADDITIVE INGREDIENT PALETTE

(75) Inventors: Christopher Beard, Gurnee, IL (US); Kylee E. Eblin, Racine, WI (US); Fred J. Joachim, Sturtevant, WI (US); H. Fisk Johnson, III, Racine, WI (US); Frank A. Jones, Waukesha, WI (US); Jennifer C. Perkins, Pewaukee, WI (US); Robert J. Seifert, Racine, WI (US); Kelly M. Semrau, Racine, WI (US); George C. Daher, Pleasant Prairie, WI (US); Usha Vedula, Racine, WI (US)

(73) Assignee: S. C. Johnson & Son, Inc., Racine, WI (US)

(*) Notice: Subject to any disclaimer, the term of this patent is extended or adjusted under 35 U.S.C. 154(b) by 244 days.

(21) Appl. No.: 13/155,166

(22) Filed: Jun. 7, 2011

(65) Prior Publication Data
US 2011/0314020 A1    Dec. 22, 2011

Related U.S. Application Data

(60) Provisional application No. 61/355,582, filed on Jun. 17, 2010, provisional application No. 61/377,284, filed on Aug. 26, 2010.

(51) Int. Cl.
*G06F 7/00*      (2006.01)
*G06Q 10/08*     (2012.01)
*G06F 16/28*     (2019.01)

(52) U.S. Cl.
CPC ......... *G06Q 10/087* (2013.01); *G06F 16/285* (2019.01)

(58) Field of Classification Search
CPC .................................................... G06F 16/285
USPC .................................... 707/999.101, 999.102
See application file for complete search history.

(56) References Cited

U.S. PATENT DOCUMENTS

| | | | |
|---|---|---|---|
| 6,163,732 A     | 12/2000 | Petke et al. | |
| 6,200,945 B1 *  | 3/2001  | Lally ..................... | C11D 7/261 134/2 |
| 6,973,362 B2    | 12/2005 | Long et al. | |
| 7,096,084 B2    | 8/2006  | Long et al. | |
| 7,398,270 B1 *  | 7/2008  | Choi ....................... | G06F 16/35 |
| 7,531,710 B2 *  | 5/2009  | Carson ................... | A61L 2/025 588/410 |
| 8,076,277 B2 *  | 12/2011 | Luciow .................. | A61K 8/345 510/130 |

(Continued)

FOREIGN PATENT DOCUMENTS

| | | |
|---|---|---|
| KR | 1020010031611 | 12/2001 |
| KR | 1020030005461 | 1/2003 |

OTHER PUBLICATIONS

A Jun. 2009 web site excerpt from the FDA (www.fda.gov) entitled "Everything Added to Food in the United States"—prior art admitted.

(Continued)

*Primary Examiner* — Eliyah S. Harper
(74) *Attorney, Agent, or Firm* — Quarles & Brady LLP

(57) ABSTRACT

Disclosed are methods for developing authorized chemical palettes for formulating products with reduced adverse environmental and/or health concerns, and advising the public to a greater extent regarding the ingredients of products formulated using these palettes. Also disclosed are computer systems to implement such methods.

14 Claims, 2 Drawing Sheets

(56) References Cited

U.S. PATENT DOCUMENTS

| | | | |
|---|---|---|---|
| 9,926,514 B1* | 3/2018 | Wycoff | C11D 3/3715 |
| 2002/0049771 A1* | 4/2002 | Nagashima | 707/104.1 |
| 2002/0056638 A1 | 5/2002 | Ohishi et al. | |
| 2002/0099587 A1* | 7/2002 | Kakihana | G06Q 10/06 705/308 |
| 2003/0004965 A1* | 1/2003 | Farmer | G16C 20/90 |
| 2004/0093340 A1* | 5/2004 | Edmondson | G06Q 10/10 |
| 2004/0121058 A1* | 6/2004 | Jayalekshmy | A61K 36/48 426/489 |
| 2006/0085450 A1* | 4/2006 | Seubert | G06Q 30/04 |
| 2007/0191257 A1* | 8/2007 | Andretta | A61Q 13/00 512/1 |
| 2011/0004414 A1* | 1/2011 | McKim | G01N 33/5014 702/19 |

OTHER PUBLICATIONS

Notice from the European Patent Office dated Oct. 1, 2007 concerning business methods; XP007905525; vol. 30, No. 11; Nov. 1, 2007; pp. 592-593.
PCT/US2011/001075 International Search Report dated Aug. 10, 2011.

* cited by examiner

CHEMICAL ADDITIVE INGREDIENT PALETTE

CROSS-REFERENCE TO RELATED APPLICATIONS

This application claims priority based upon U.S. provisional application 61/355,582 filed Jun. 17, 2010 and U.S. provisional application 61/377,284 filed Aug. 26, 2010.

STATEMENT REGARDING FEDERALLY SPONSORED RESEARCH/DEVELOPMENT

Not applicable.

BACKGROUND OF THE INVENTION

The present invention relates to methods for producing products (especially household products such as air care products, cleaning products, personal care products, pest control products, and home storage products) with reduced environmental and health concerns. It also relates to methods for better informing the public regarding the chemical make-up of such products without materially undermining trade secret protection on proprietary component/additive materials used therein, and computer systems useful therewith.

Environmental and health concerns exist relating to the use of certain chemicals for certain household and other purposes where humans will be likely to come into contact with them. Some chemicals present direct health and/or environmental concerns. Others present indirect concerns because they degrade to a problematic material, or have a tendency to combine/react with common materials to thereby create something problematic. Moreover, while many other chemicals don't have these problems, for some the way they are typically produced can be environmentally problematic.

Adding further complexity is the fact that suppliers of complex component materials sometimes keep the exact nature of their materials confidential. This is a particularly prevalent practice with respect to complex fragrancing materials, but is also sometimes seen in other fields such as colorants, surfactants, preservatives, emulsifiers, flavors, and other product adjuvants and additive packages. Such suppliers often are willing to disclose a primary attribute of the material (e.g. that it is lilac based), but often refuse to disclose some secondary ingredients.

Some consumers have allergies, asthma, or other sensitivities, leading them to avoid using or being exposed to products where they are not sure of all of the chemicals that could be in those products. Thus, it is desirable to provide greater information to consumers about the content of products that consumers are exposed to. Companies therefore disclose product contents on the product label and/or via associated web sites. However, in these contexts they often do not provide details about certain secondary proprietary materials included therein (e.g. they refer to the product as containing a fragrance, flavor or color, without details as to the nature of the fragrance, flavor or color).

While some components that might be proposed for use in household materials are clearly acceptable from an environmental/health standpoint ("green flag", e.g. water), and others are generally recognized as unacceptable from an environmental/health standpoint ("red flag", e.g. asbestos), there are some ingredients that could be proposed for use in certain household products which require further analysis/study before final categorization for that application. Regardless, even a preliminary categorization of a material's environmental and/or health risks can be frustrated if a fragrance, surfactant, color or other additive supplier is unwilling to disclose some of the ingredients therein even to a product formulator.

U.S. Pat. Nos. 6,973,362 and 7,096,084 described various methods for formulating commercial products for particular applications using numerical scores for the known component chemicals with respect to specific environmental or health concerns. However, these patents did not address the problem of how to deal with components of a trade secret nature, or techniques for better informing the public about the nature of the formulated product, or how to deal with a developing and changing range of environmental and health concerns.

Thus, a need exists to provide improvements in these areas.

SUMMARY OF THE INVENTION

In a first aspect the present invention provides methods of producing a list of chemicals that have been pre-approved for use in selected products. One identifies all chemical components of at least ten different multi-chemical materials, wherein the identifying involves obtaining from one or more third parties, under confidentiality restriction, information identifying all chemical components of the ten multi-chemical materials.

Based at least in part on a review of environmental and health concerns one classifies the identified chemical components into the following groups:

(i) a group of pre-approved components; and
(ii) a group of excluded components.

One can also classify the identified chemical components into:

(iii) a group of components requiring further consideration as to whether to be included or excluded.

Then, one creates a list of the components which are pre-approved for inclusion in the selected products, and discloses the list of pre-approved components included in the products without confidentiality restriction in a manner that does not identify which chemicals covered by the confidentiality restriction are in which multi-chemical material.

The multi-chemical materials can be multi-chemical fragrancing materials, and the products can be fragranced products selected from the group consisting of air care products, home cleaning products, personal care products, pest control products and home storage products.

Alternatively, the multi-chemical materials can be multi-chemical colorants, multi-chemical surfactants, multi-chemical plastics additives, multi-chemical flavorants, multi-chemical food additives, multi-chemical pharmaceutical additives, and the like. As examples of products in which such multi-chemical materials may be used, "air care products" could include by way of example and not limitation, real and electronic candles, products used for freshening the air, positive fragrancing, deodorizing, odor control, odor elimination, disinfecting, sanitizing, or aromatics in homes, offices, automobiles, or in one's personal area or outdoors; "home cleaning products" could include by way of example and not limitation, products used for cleaning, disinfecting, sanitizing, dusting or polishing in and around a home, office, automobile, one's personal area or outdoors, including products used for unclogging or otherwise clearing or cleaning plumbing or toilets in homes or offices, and chemicals, cleaning tools and devices, chemical dispensers and the like; "personal care products" could include by way of example and not limitation products used for cleaning, fragrancing or deodorizing the body or hair, removal of body hair, shaving, after-shave, personal hygiene, and therapeutics, such as lotions, moisturizers and other formulations which are applied to the body and bath, together with devices for holding, dispensing, applying, or enhancing such formulations, and baby care products; "pest control products" could include by way of example and not as limitation, products used for control of arthropod and small mammal pests (including by way of example and not as limitation, such control by means of insecticides, insect repellents, delivery devices for the same, and rodent control chemicals and devices) and products for use as, or with, fertilizers, herbicides, fungicides, or algaecides; and "home storage products" could include by way of example and not as limitation, products used for reusable or disposable food storage, serving, preparation and handling wares, wraps and storage containers.

In another aspect the invention provides a method of producing a product. One obtains under confidentiality restriction information identifying chemical components of a multi-chemical material proposed for use in the product. One then compares those chemical components with a list of pre-approved chemicals, where the list represents chemicals not excluded by adverse environmental and/or health considerations.

One also determines whether all of the chemical components of the multi-chemical material are on the list and, if so, formulates the product with the multi-chemical material therein. Further, one discloses the list publically without specifically disclosing that at least some of the chemical components are in the multi-chemical material.

In preferred forms, the multi-chemical material can be a multi-chemical fragrancing material, and the product can be a fragranced product selected from the group consisting of air care products, home cleaning products, personal care products, home storage products and pest control products. The list can represent all chemicals in ten or more fragrancing materials present in at least ten (preferably at least one hundred) fragranced products marketed by a company. For example, the list could represent all chemicals in fragrancing materials in all air care products, home cleaning products, personal care products, home storage products and pest control products marketed by a company.

In yet another aspect, the invention provides an automated computer system for storing and updating a list of pre-approved chemicals. There is a first database listing at least ten selected products marketed by a company, a second database listing chemical components of at least ten different multi-component fragrances used in one or more of those products, a third database listing chemicals present in the selected products, by product (except that multi-component fragrances present in at least some of the products are identified in the third database as fragrance without disclosing at least some of their chemical components in the third database), and optionally a fourth database of chemicals excluded by health and/or environmental concerns.

The second and third databases are publically accessible by telecommunication (e.g. via the Internet). Those accessing these databases can review the chemical content of a product they are considering purchasing (except that chemical contents of a multi-component fragrance in that product will be identified by being present somewhere in the second database, without the second or third database disclosing which of the second database's components are in which third database fragrance or in which third database product).

In preferred forms:

(a) at least some chemical component information in the second database has been obtained from one or more third parties under confidentiality restriction;

(b) if a new fragrance is proposed for inclusion in the system, the system can compare the chemical components thereof with the chemical components in the second database, and if all are already in the second database a product that will be commercialized with the new fragrance can be added by the system to the first and third databases;

(c) if a new fragranced product is proposed for inclusion in the system, the system can compare the chemical components of its fragrance to the second database, and if all those components are already in the second database the system can add the new fragranced product to the first and third databases; and (d) if new environmental or health information about a particular chemical component in the second database becomes available, the system can identify those products in the first and third databases which include it, and request instructions as to whether further study is required relative to that particular chemical component.

Chemical components in the second database can be at least in part identified by Chemical Abstracts Service registry numbers ("CASRN"). The components of the multi-component fragrance are in turn identified by CASRN numbers. Hence, a comparison therebetween can be done in a reliable manner, which avoids issues deriving from the fact that many chemicals have multiple different names.

Where such CASRN identifiers are not readily available (e.g. in the context of some complex plant-derived materials such as essential oils) the comparison can be made by identifying subcomponents of the complex mixture by CASRN identifiers therefor. However, for most chemicals a CASRN number is available.

Further, if a new fragrance is proposed for inclusion in the system, and the system does not locate at least one component thereof in the second database, the system can be programmed to check to see if the component is in the fourth database. Thus, if the system has not found a proposed component in either the second or fourth databases, the system can be programmed to seek instructions as to whether the component can be added to the second database.

Note that the second database will not directly specify the chemicals in any given final product or even in any given proprietary fragrancing material. Merely by disclosing alphabetically a list of hundreds or even thousands of chemicals that might be present in a fragrance, one does not materially adversely affect its proprietary nature. Yet, a consumer will at least know which chemicals are not in the product, and that all included chemicals have been selected from a defined list developed after consideration of environmental/health issues.

If the automated computer system doesn't find a particular chemical component in the second or fourth databases, before sending out an inquiry for instructions, it could also be programmed to conduct some preliminary automated literature searching looking for health and/or environmental information.

In any event, when a formulator receives an inquiry that a component has not previously been categorized as approved or excluded, the formulator can then conduct, and/or have conducted, various literature searches, testing or other procedures to facilitate a categorization.

In the most preferred forms the products are fragranced household products. These could include air care products (e.g. air fragrancers or deodorizers), home cleaning products (e.g. toilet bowl cleaners), personal care products (e.g. sunscreen lotion, shaving cream, moisturizing lotion, shampoo), pest control products (e.g. repellents, attractants), and/or home storage products (e.g. storage containers).

Examples of known fragranced air care product formulas may be those as disclosed in U.S. Pat. No. 6,352,210. Examples of known fragranced home cleaning product formulas may be those as disclosed in U.S. Pat. No. 6,786,223. Examples of known personal care product formulas may be those as disclosed in U.S. Pat. No. 5,028,417. Examples of known fragranced pest control product formulas may be those as disclosed in U.S. Pat. No. 6,969,698.

The particular computer hardware to implement the automated computer system is not critical. Many types of office computer equipment (e.g. Dell systems) would be suitable.

It will be appreciated that the present invention creates approved chemical "palettes" for formulating products that take into account environmental and health concerns. In use, one approaches a large group of fragrancing material and other proprietary component suppliers. The suppliers will then be asked to disclose all of the chemical components of their materials to the palette compiler (for materials they want considered for inclusion), under the form of confidentiality described herein. The confidentiality agreements will permit chemicals which are "green flagged" to be included in the publishable second database.

The palette developer will sort out the proposed chemicals into at least three groups. A red flag list (a prohibition/exclusion list) will contain chemicals with known significant health or environmental problems. A green flag list will contain chemicals that, without further analysis, merit inclusion on a generally approved list. A "blue flag" list will contain chemicals that merit further environmental and/or health concern review before final classification.

Once all the components of a proposed material are classified/flagged, the overall fragrancing material is classified based on the most problematic flag for any component therein. Then, after evaluating the compatibility of the material with the other ultimate product components (e.g. surfactant and water in a cleaning product) the final product is formulated, preferably using only green flag coded component materials.

These and still other advantages of the present invention will appear from the following description. In that description reference is made to the accompanying drawings in which there is shown by way of illustration preferred embodiments of the invention. However, the claims should be looked to in order to judge the full scope of the invention.

DETAILED DESCRIPTION OF THE PREFERRED EMBODIMENTS

A company compiling the databases will enter into confidentiality agreements with the supplier(s) of proprietary fragrancing and/or other proprietary materials. The entire chemical content of those materials is to be disclosed to the compiler, or the compiler will reject that material on that basis alone. Note that this concept can be used in a wide range of industries, depending on the type of multi-component material selected.

Figure 1:
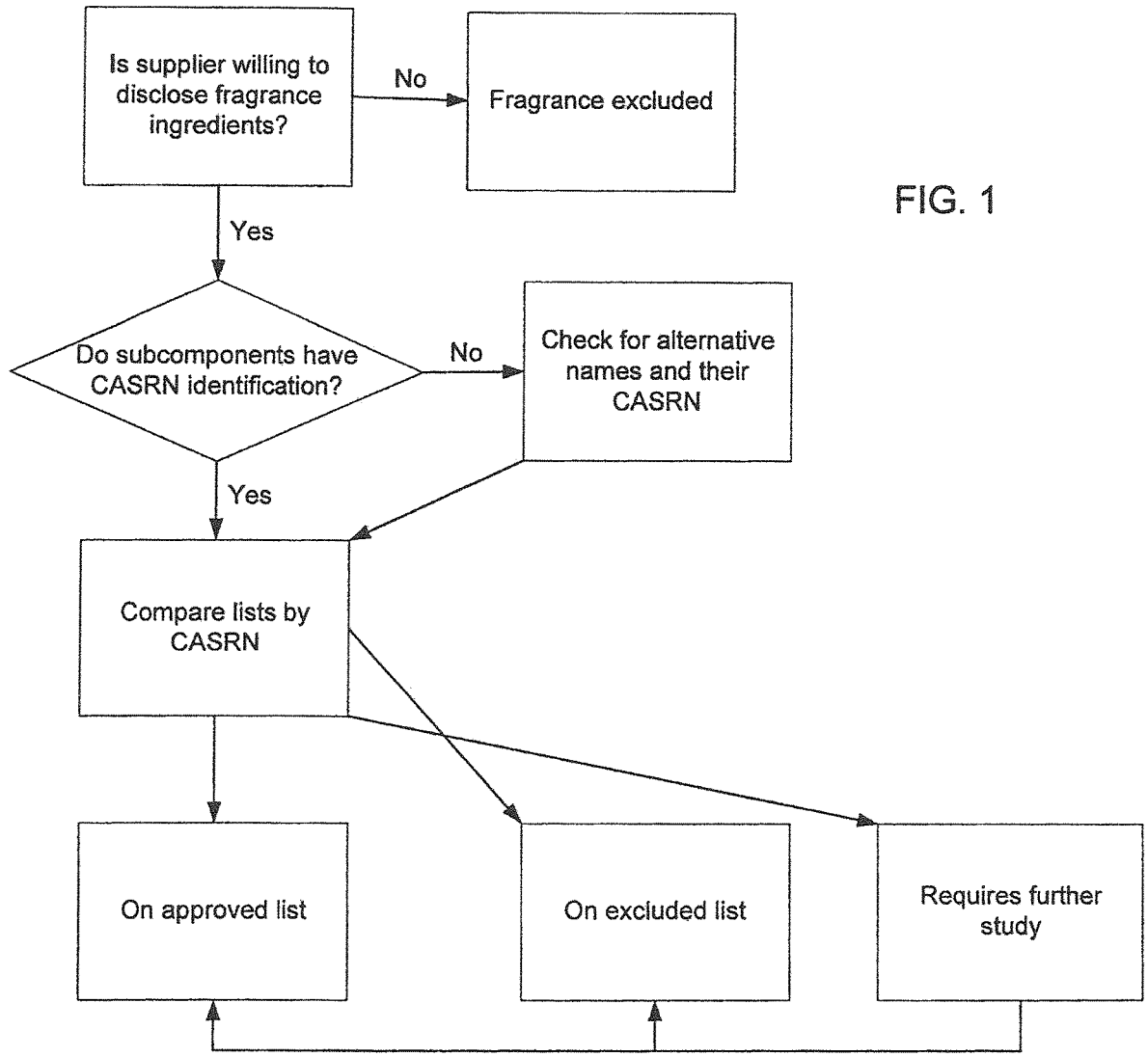
FIG. 1 is a flow chart illustrating a process of the present invention for classifying the components of a proposed multi-component fragrancing material as authorized, excluded or requiring further evaluation.

Per FIG. 1, one obtains the chemical content of a proprietary fragrance or other proprietary material (e.g. multi-chemical colorants, multi-chemical surfactants, multi-chemical plastics additives, multi-chemical flavorants, multi-chemical food additives, multi-chemical pharmaceutical additives) under confidentiality and then compares each component to the second database. If a component is not on that list, the fourth database is checked. If the chemical component is not on either the second or fourth list, analysis can then be conducted to try to classify it.

In determining flag codes/classifications, one can review publicly available lists of highly problematic materials such as California Proposition 65 lists, International Agency for Research on Cancer lists, National Toxicology Program lists, U.S. Environmental Protection Agency Carcinogens lists, European Union Endocrine Disruptors lists, European Union Cancer, Mutagen and Repro Tox lists for Cancer, Mutagens, Repro Tox, Acute Toxicity, Dermal Sensitization, Respiratory Sensitivity, Ecological Toxicity, European Union Substances Of Very High Concern lists, Environmental Working Group Skin Deep databases, ChemSec Substitute It Now lists, Environmental Protection Agency Toxic Release Inventory Persistent Bioaccumulative & Toxic lists, and EPA PBT Profiler lists. One may also review other literature or other lists of emerging issues.

For example, if a fragrancing supplier proposes a complex fragrancing material containing minor amounts of ground diamond powder as an ingredient, and the literature is reporting an emerging concern about diamond-based materials due to "conflict" environmental disruptions, one might initially flag that component as blue until confirming whether the powder is synthetic diamond powder or a powder from natural diamonds that could possibly be conflict diamonds.

In another example, a fragrancing material is proposed for inclusion in a standard liquid hand soap. The fragrancing material could contain one or more (or all) of isobutanol, pulegone, linalool, acetaldehyde and/or diethyl phthalate. Each subcomponent is analyzed as follows:

a. For isobutanol no problematic concerns are found. Hence, this chemical is classified as an approved fragrancing component added to the second database.

b. For pulegone no problematic concerns are initially found but the testing data available to the formulator on this compound is not well developed. Hence, it is initially classified as blue flagged until further literature search and/or testing can confirm the initial findings.

c. For linalool no direct red flag concerns are initially found. However, there is a theoretical oxidation product of linalool, peroxide, which has been reported to have significant issues. Hence this component is blue flagged pending a further analysis to determine whether expected oxidation levels are at problematic levels.

d. For acetaldehyde the compound is on the California Proposition 65 list (and it also appeared in other problematic lists). It is excluded/red flagged, and therefore added to the fourth database.

e. For diethyl phthalate no red flags initially were found. However, there are indications of a borderline rating in the skin deep evaluation, and a heightened level of public concern for the chemical class of phthalates in general associated with unknown or untested developmental toxicity effects. Hence, as a precaution, it is excluded and added to the fourth database.

Once the excluded and pre-approved lists are created for a large number of fragrances found in a large selection of products marketed by a company, a first database of the selected products formulated using approved chemicals can be created. Then, a third database can be created where each of these products is linked to a description of its chemical components. This breakdown of chemical content is specific, except that where a proprietary fragrancing material is used, it is merely noted that the product has fragrance, and a link is provided to the second database for more information. If a consumer wishes they can then link to that database and see what compounds might be in the fragrancing material, and thus what will not be.

Figure 2:
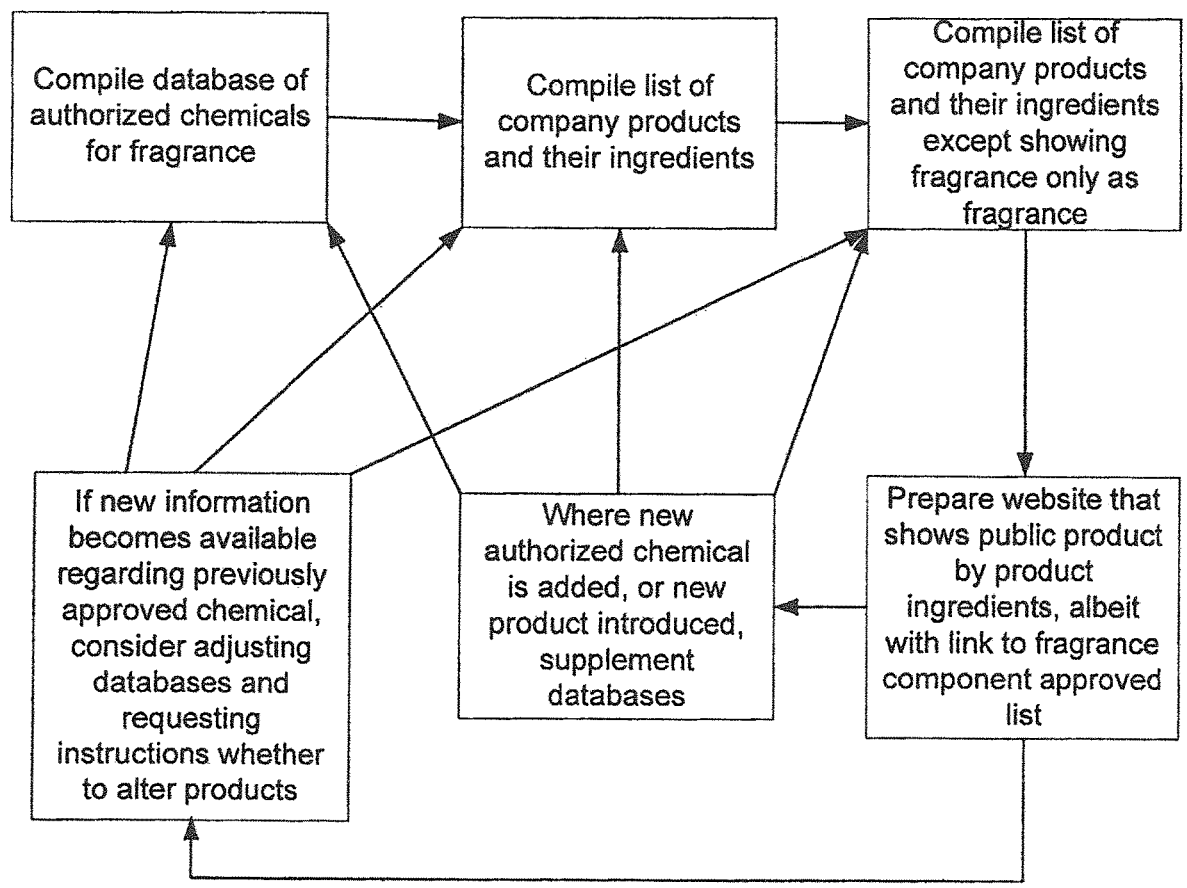
FIG. 2 is a flow chart depicting how the databases of the automated computer system of the present invention are developed and updated.

As depicted in FIG. 2, the above methods can be facilitated with an automated computer system. The three key databases are created (and optionally a fourth database of excluded components). The system can then, in an automated telecommunication linked fashion, inform the public in the above manner. Moreover, the system facilitates updates as new products, new fragrances, and/or new concerns arise.

For example, if a previously approved chemical is newly reported in the literature to require further environmental or health review, the system can scan the databases to highlight which products/fragrances have that chemical. The system can provide a report regarding the list of possibly affected products, and provide the option of deleting the chemical (and the affected products) from the affected databases.

Further, when a new fragrancing material is proposed, its components (e.g. preferably identified by CASRN numbers) can be entered into the system, which can then, in an automated fashion, compare the components to the second database. If all components are already in the second database, new proposed products containing that fragrancing material can be added to the first and third databases.

If some of the components are in the fourth excluded database, the fragrancing material can be rejected. If some of the components are not in the second database, and none are in the fourth, those components not previously classified can be highlighted for further review.

Although preferred embodiments of the present invention have been described, it will be apparent that a number of revisions could be made within the spirit and scope of the invention. In this regard, while the system is most suitable for use with proprietary fragrances incorporated into certain consumer products, its teachings are applicable to other types of proprietary materials and ultimate products.

For example, the same principles applicable to fragrances could be applied to proprietary colorants, or other proprietary additives, as applied in these types of products or other consumer or other products. Accordingly, the claims should be referred to in order to determine the full scope of the invention.

INDUSTRIAL APPLICABILITY

The invention provides methods of developing pre-authorized chemical palettes for formulating products with reduced environmental and health concerns, methods of using them to develop environmentally friendly products and advise the public regarding what chemicals are in a company's products, and computer systems useful to implement these methods.

What is claimed is:
1. A method of producing a product, comprising:
formulating a product from a plurality of chemical components, including at least one multi-chemical material comprising multiple chemicals;
obtaining under confidentiality agreement restrictions information identifying the chemicals of the multi-chemical material proposed for use in the product;
comparing, by a computer having a processor and at least one database, the chemicals of the multi-chemical material with a list of pre-approved chemicals stored in the at least one database, where the list represents chemicals not excluded by adverse environmental and/or health considerations;
only if all of the chemicals of the multi-chemical material are on the list,
combining the multi-chemical material with a remainder of the plurality of chemical components in order to produce the product with the multi-chemical material therein, where the multi-chemical material includes only chemicals on the list; and
disclosing the list and the product publically by providing telecommunication access to the at least one database, whereby the list includes chemicals not present in the multi-chemical material and the product, and whereby the list does not specify a multi-chemical material or a selected product of which each chemical on the list is a component, such that the list does not specifically directly disclose which chemical components, for which identifying information was obtained under the confidentiality agreement restrictions, are in a specific multi-chemical material or in the product.

2. The method of claim 1, wherein the multi-chemical material is a multi-chemical fragrancing material and the product is a fragranced product.

3. The method of claim 2, wherein the fragranced product is selected from the group consisting of air care products, home cleaning products, personal care products, pest control products, and home storage products.

4. The method of claim 3, wherein the list represents all chemicals in at least ten fragrancing materials present in fragranced products marketed by a company.

5. The method of claim 3, wherein the list represents chemicals in fragrancing materials of at least one hundred selected products marketed by a company.

6. The method of claim 3, wherein the list represents all chemicals in fragrancing materials in all air care products, home cleaning products, personal care products, pest control products, and home storage products marketed by a company.

7. An automated computer system for storing and updating a list of pre-approved chemicals, the system comprising:
a computer comprising a processor, the computer having stored therein databases, the databases comprising:
(a) a first database listing selected products marketed by a company;
(b) a second database listing only approved chemical components of different multi-component materials used in one or more of those products, without any indication of any multi-component materials or products, if any, of which they are components, whereby the list of chemical components includes components not present in one or more of the different multi-chemical materials and one or more of the selected products; and
(c) a third database listing chemicals present in the selected products, by product, except that multi-component materials present in at least some of the products are identified in the third database without disclosing at least some of their chemical components in the third database; and (d) a fourth database of excluded chemical components;

wherein the second and third databases are publically accessible by telecommunication so that accessing these second and third databases permits a review of the chemical content of a selected product, except that chemical contents of a multi-component material in that product will be identified by being present in the second database, without the second or third database directly disclosing which of certain of the components in the second database are in which third database multi-component material or in which third database product; and wherein, upon receiving a new formulation for a product to be marketed by the company, the processor is configured to first compare each chemical component of the new formulation against the second database in order to determine whether to approve the formulation.

8. The automated computer system of claim 7, wherein the multi-component materials are fragrances.

9. The automated computer system of claim 7, wherein at least some chemical component information in the second database has been obtained from one or more third parties under confidentiality agreement restriction.

10. The automated computer system of claim 7, wherein if a new multi-component material is proposed for inclusion in the system, the system can compare the chemical components thereof with the chemical components in the second database, and if all are already in the second database a product that will be commercialized comprising the new multi-component material can be added by the system to the first and third databases.

11. The automated computer system of claim 7, wherein if every chemical component of the new formulation is already in the second database, the system can add the new product to the first database and add to the third database or verify that the third database includes each chemical component of the new formulation.

12. The automated computer system of claim 7, wherein if a particular chemical component in the second database is believed to have developed an environmental or health concern, the system can identify those products in the first and third databases which contain it, and request instructions as to whether to remove those products from those databases and remove that component from the second database.

13. The automated computer system of claim 7, wherein if every chemical component of the new formulation is not present in the second database, the processor then is configured to compare each chemical component not present in the second database against the fourth database in order to determine whether to reject the new formulation.

14. The automated computer system of claim 13, wherein if the system has not found a proposed chemical component in either the second or fourth databases, the processor then is configured to seek instructions as to whether the component can be added to the second database.

* * * * *